E. A. RYAN.
CHAIN PLACING AND REMOVING DEVICE.
APPLICATION FILED DEC. 15, 1916.
1,325,333.
Patented Dec. 16, 1919.
4 SHEETS—SHEET 1.
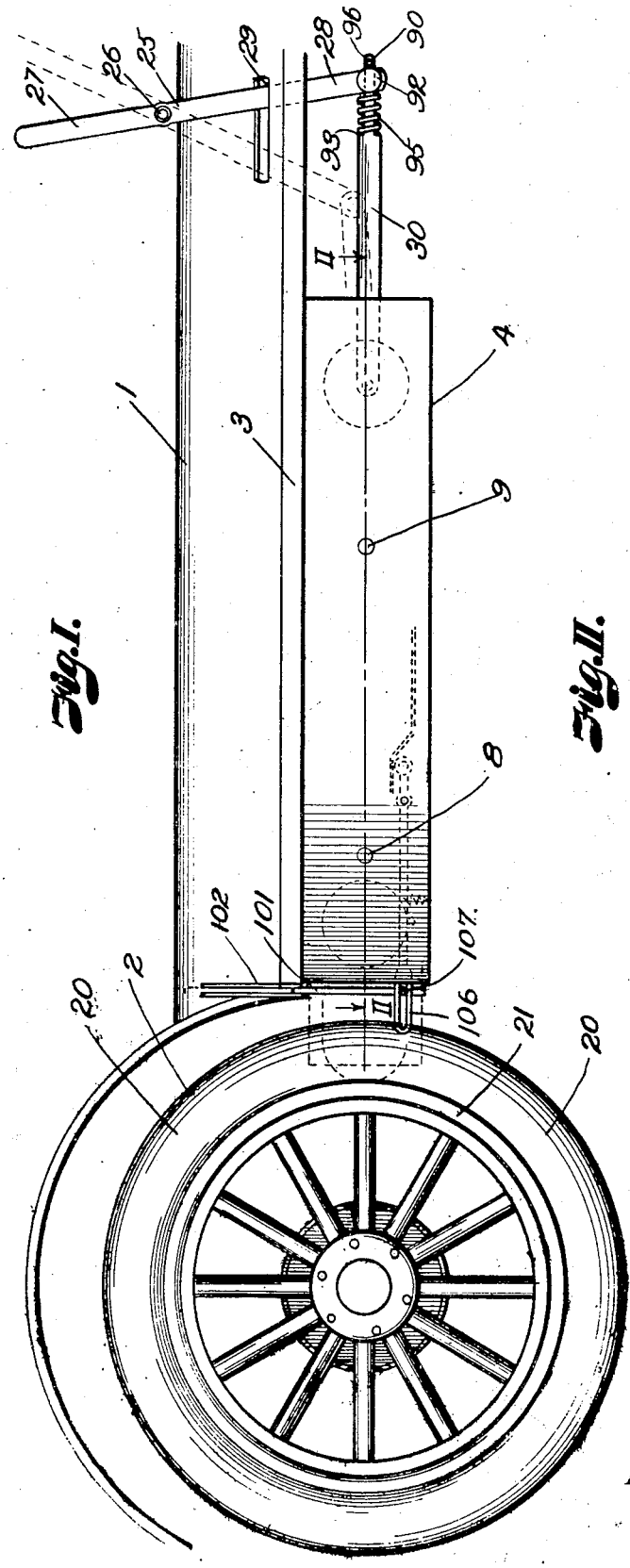
INVENTOR.
E. A. Ryan.
BY Arthur C. Brown
ATTORNEY

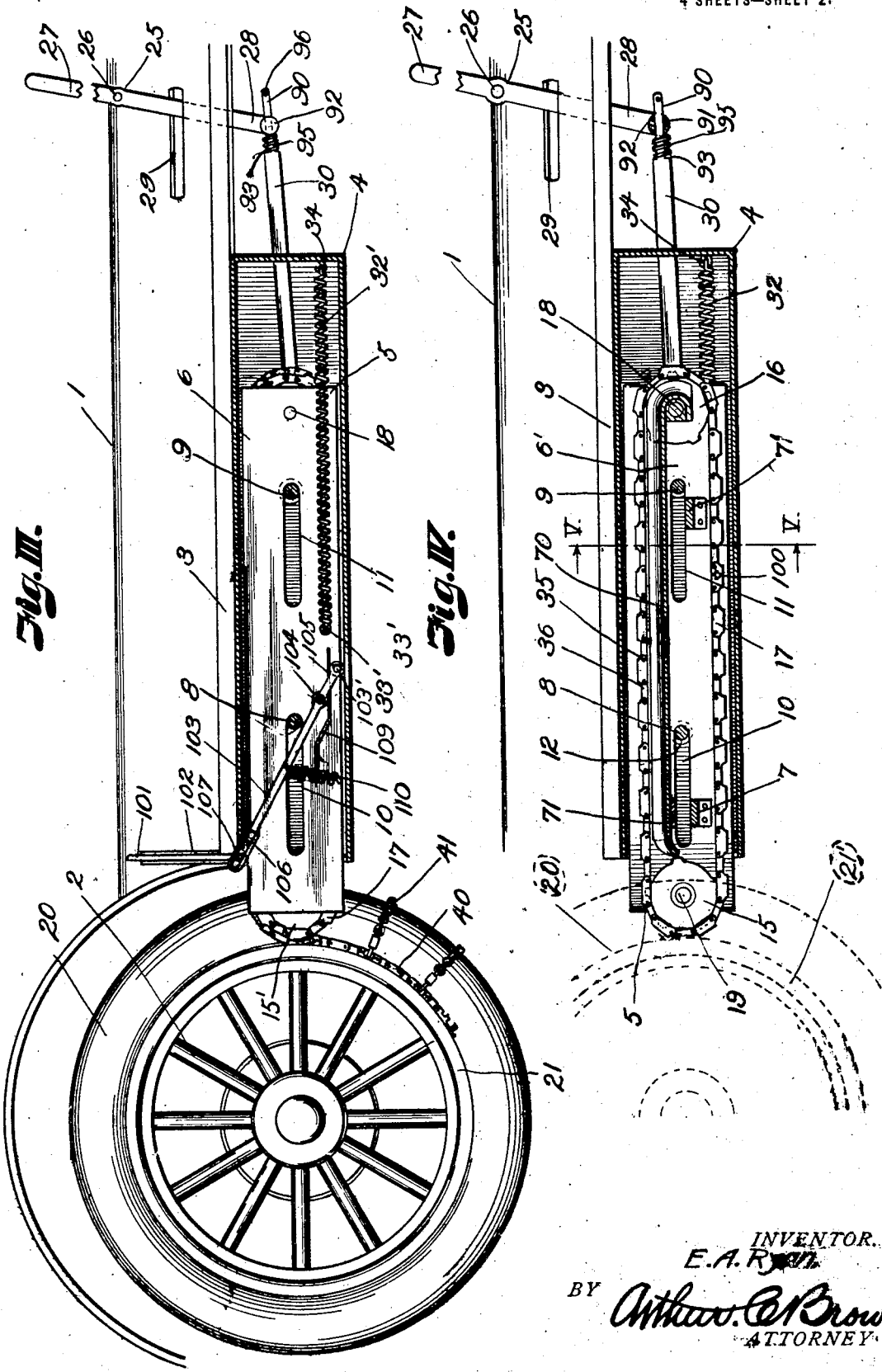

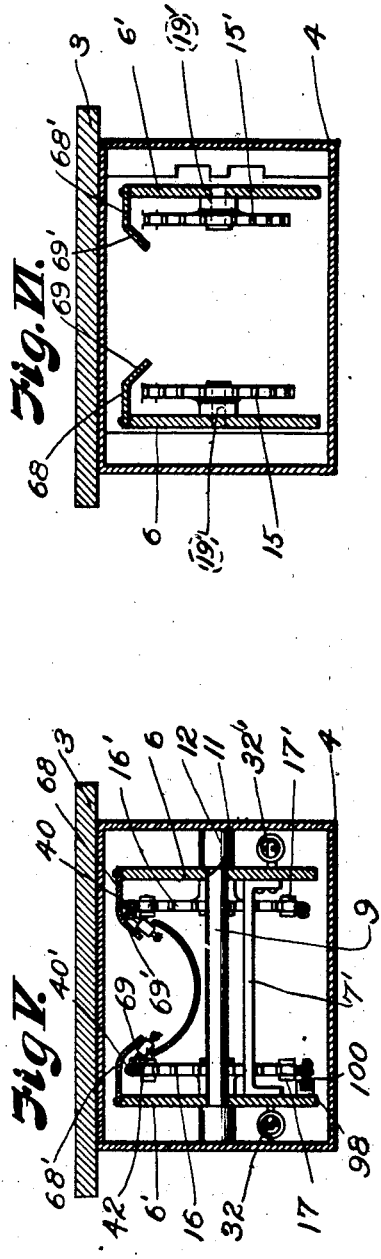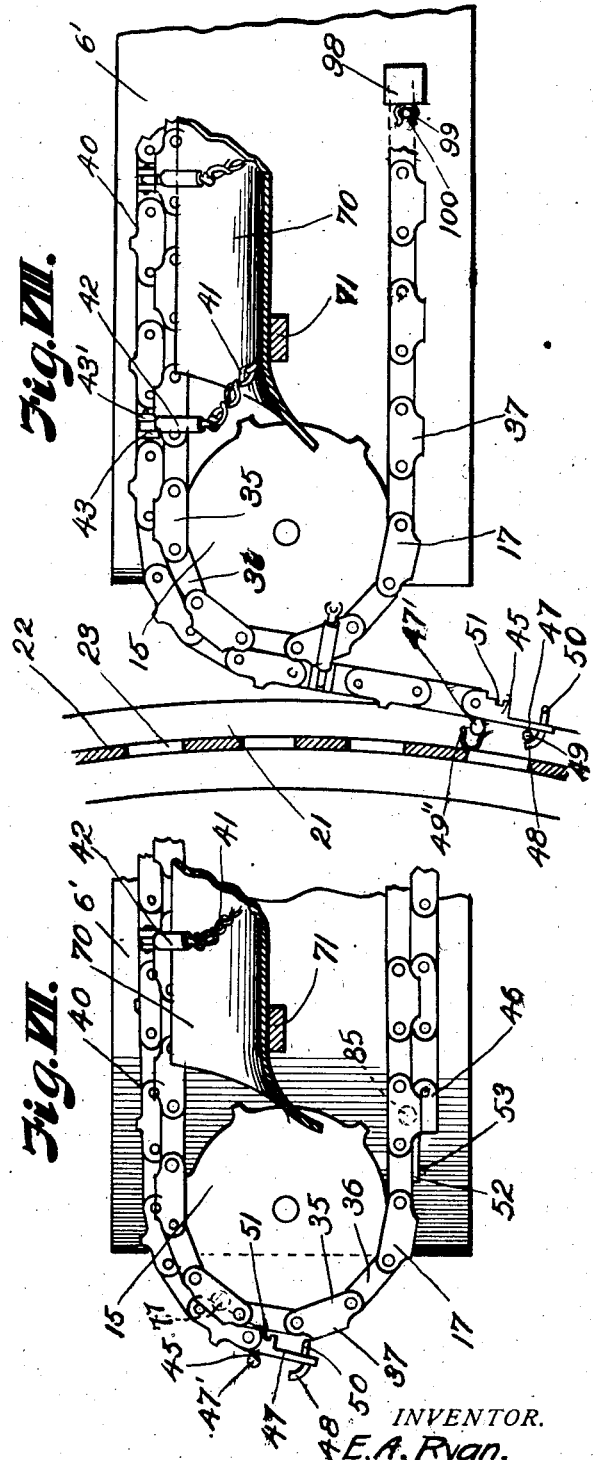

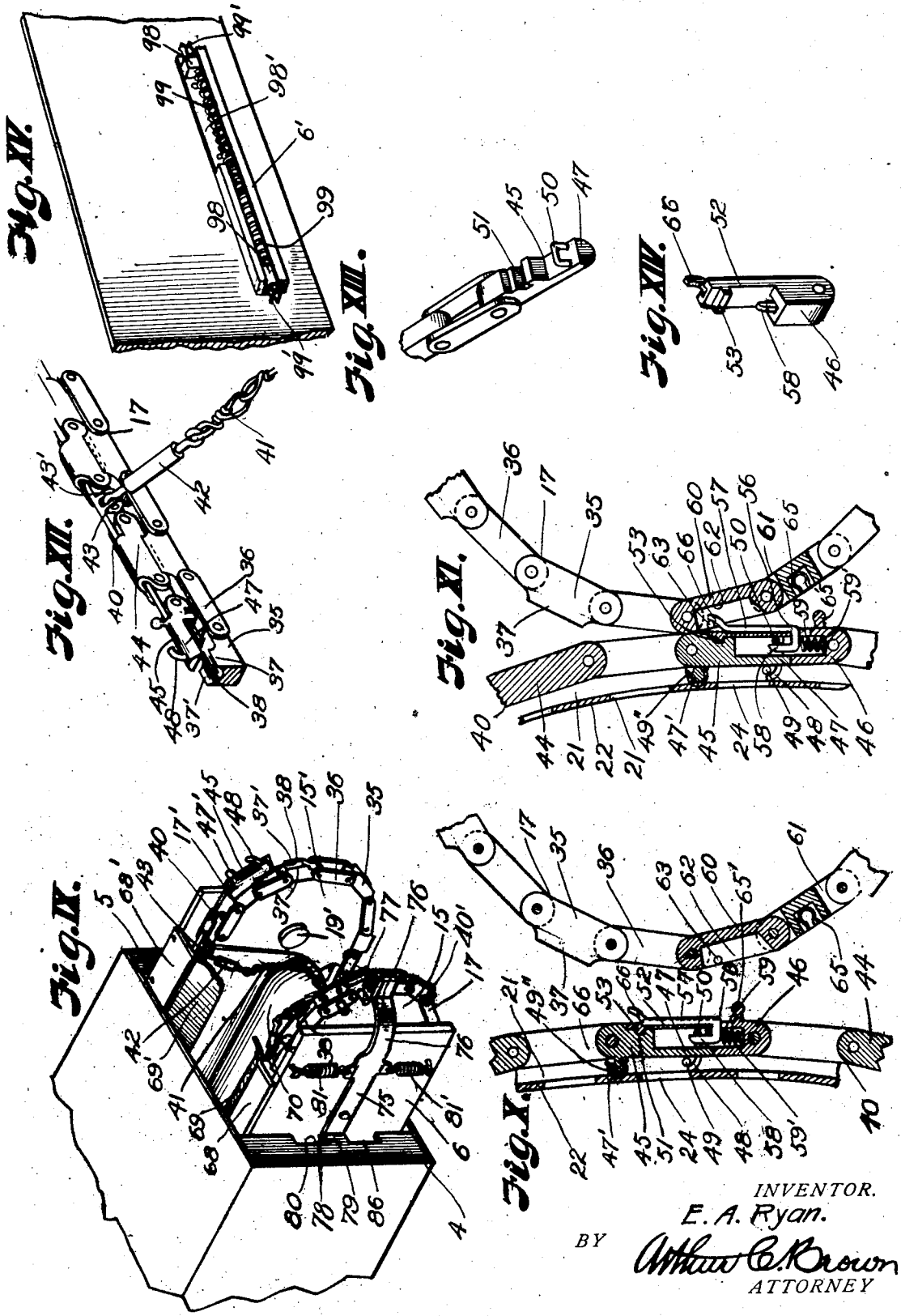

UNITED STATES PATENT OFFICE.

EDWARD A. RYAN, OF KANSAS CITY, MISSOURI, ASSIGNOR OF ONE-THIRD TO WILLIAM W. FARNSWORTH, OF LITTLETON, COLORADO, AND ONE-THIRD TO EDWARD H. WHITE, OF CUMBERLAND, MARYLAND.

CHAIN PLACING AND REMOVING DEVICE.

1,325,333.   Specification of Letters Patent.   Patented Dec. 16, 1919.

Application filed December 15, 1916. Serial No. 137,246.

*To all whom it may concern:*

Be it known that I, EDWARD A. RYAN, a subject of Great Britain, residing at Kansas City, in the county of Jackson and State of Missouri, have invented certain new and useful Improvements in Chain Placing and Removing Devices; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to mechanism for placing and removing tire chains, and has for its principal object to provide mechanism whereby an occupant of a motor driven vehicle may, without leaving the vehicle, effect the placement of chains—of the ordinary anti-skid type—about or remove the same from the vehicle wheels. More particularly the mechanism comprises carriages mounted on the vehicle and movable to positions which will permit chains carried thereby to be engaged by coöperating parts on the wheels to carry the chains about the wheels, together with devices for locking the chains on or unlocking the same from the wheels and lever mechanism for operating the carriages to effect placement or removal of the chains.

It is also an object of the invention to provide a tire chain for use with the placing and removing mechanism, and in accomplishing the objects of the invention I have provided improved details of structure, the preferred forms of which are illustrated in the accompanying drawings, wherein:—

Figure I is a side view of a portion of an automobile showing one of the drive wheels and a foot board with chain placing and removing mechanism, embodying the present invention, mounted beneath the foot board.

Fig. II is a horizontal section of the same on the line II—II, Fig. I.

Fig. III is a side view of the same parts, showing the chain carriage in position for removing or placing the tire chains on the drive wheel; the front face of the carriage housing being removed to show the slidable mounting of the carriage, the carriage returning springs, and the door opening mechanism.

Fig. IV is a central vertical section through the mechanism on the line IV—IV, Fig. II.

Fig. V is a transverse, vertical section on the line V—V, Fig. IV.

Fig. VI is a transverse, vertical section on the line VI—VI, Fig. II.

Fig. VII is a view showing the normal position of the end links of the tire chains when mounted on the placing carriage.

Fig. VIII is an enlarged side elevation of parts of the mechanism, showing a vehicle wheel and chain rim, and illustrating the position of the tire chain and chain carriage when the latter is moved to position to place the chains on the wheels.

Fig. IX is a detail perspective view of the open end of the carriage housing, particularly illustrating the location of the retaining latch and latch notches.

Fig. X is a sectional view of the end links of the tire chain in locked position about a vehicle wheel.

Fig. XI is a similar view showing the parts as they appear when the chain is to be removed from the wheel.

Fig. XII is an enlarged perspective view of portions of the tire chains and carriage belt.

Fig. XIII is a perspective view of the forward end link of a tire chain band.

Fig. XIV is a perspective view of the rear link of a chain band.

Fig. XV is an enlarged perspective view of a portion of a carriage side plate, showing the belt stops.

Referring more in detail to the drawings:

1 designates an automobile of any ordinary construction, having drive wheels 2 and running or foot boards 3.

Mounted beneath each foot board 3 is a housing 4 preferably rectangular in cross section and constructed of sheet metal, and having an open end 5 terminating in slightly spaced relation to the periphery of the adjacent rear wheel of the vehicle at a level with the axle, it being understood that the housings and chain placing mechanism presently described are in duplicate on opposite sides of the vehicle although but one will be mentioned in the detail description.

Mounted within the housing 4 is a tire chain carriage, comprising spaced, vertically disposed side plates 6—6' rigidly connected by cross bars 7—7' and slidably supported on cross rods 8—9, which extend transversely between the side walls of the housings 4 and project through horizontally and longitudinally disposed slots 10—11 in the opposite side plates 6—6', so that the carriage may be moved longitudinally within the housing and extended from the open end 5 to position to coöperate with the driving wheel 2; the carriage being retained in proper alinement and spaced from the housing walls by hubs 12 on the outer ends of the cross rods 8—9 on which the carriage is supported.

Arranged in spaced relation at the forward and rear ends of the carriage are paired sprocket wheels 15—15' and 16—16' which carry endless chain belts 17—17'; the rear pair of wheels 16—16' being mounted on a cross shaft 18 and the forward pair 15—15' on stub shafts 19—19' that extend inwardly from the opposite side plates 6—6' and are spaced to receive the tire 20 and chain rings 21—21' of the wheel 2 therebetween when the carriage is moved rearwardly to place the chains.

The rings 21—21' are bolted or otherwise attached to the wheel fellies, or may, if desired, be made as a part of a demountable tire rim, and each is provided with an extended flange 22 having an outwardly opened seating groove 23 therein for seating the tire chain presently described. The bases of the grooves 23 are preferably provided with closely spaced openings 24 for the escape of dirt or mud which might clog or fill the groove and prevent proper mounting of the chain.

In order that an operator may move the carriage longitudinally within the housing when it is desired to place or remove the chain, I provide a hand lever 25, which is mounted on a pivot pin 26 extending from the side of the vehicle body and has an upwardly extended arm 27 terminating at a point easily accessible to the operator, and an arm 28 extending downwardly through a slot 29 in the foot board apron and pivotally connected at its lower end with a bar 30 that extends rearwardly through a slot 31 in the closed end of the housing 4 where it pivotally connects with the outer end of the sprocket wheel axle 18.

To normally retain the carriage at its forward limit I provide springs 32—32' having their rear ends attached to pins 33—33' at opposite sides of the carriage 5 and attached at their opposite ends to hooks 34 at the closed end of the housing.

When the lever arm 27 is moved forwardly to rock the arm 28 rearwardly, the link 30 will move the carriage rearwardly against the tension of the springs 33—33', but on releasing the lever 27 the springs draw the carriage back to its initial position.

To properly carry the chain, the endless carriage belts 17—17' comprise specially formed links 35, which are placed alternately with the common chain links 36; the links 35 having flanges 37—37' extending outwardly at opposite sides of the outer bearing surface and forming an intermediate guide groove 38 for receiving the side bands 40—40' of the tire chain.

The tire chain here shown is of ordinary construction, except for the improvements hereinafter noted and comprises side bands 40—40', which are connected at intervals by cross chains 41 and is adapted, when in position on the wheel, to inclose the tire to provide the required traction; the cross chains 41 being pivotally connected at their ends with opposite links of the bands 40—40' by links 42 which are pivotally mounted between ears 43—43' on the side faces of the said band links.

In the present device each side band 40—40' is made up of a plurality of links 44 that are slightly oval in cross section and adapted to seat in a groove 23 of the wheel ring 21 or 21' and also seat in a guide groove 38 in the upper face of the links 35 of a belt 17 or 17'; each of the bands being of a length to exactly inclose a ring 21 or 21' on the wheel 2 and provided at its opposite ends with interlocking links 45—46, of peculiar construction, whereby the band may be locked in functional position about the wheel rim.

When the tire chain is housed, the end links 45, which initially engage the wheel rings 21—21' when the carriage is moved rearwardly, are positioned at the outer edge of the wheels 15—15' (Fig. VII) and comprise extended arms 47 having outwardly and rearwardly curved hooks 48 thereon at their forward ends which are adapted, when the carriage is moved rearwardly, to be simultaneously engaged by pins 49—49' that extend transversely across the grooves 23 in the wheel rings 21—21' (Fig. VIII) and have buttons 47' thereon which are adapted to seat in snap sockets 49'' in the rings 21—21', so that as the drive wheel revolves to move the vehicle forwardly, the tire chain is locked to the rims and drawn from about the endless carriage belts 17—17' and carried about the wheel rings to inclose the wheel tire.

To lock the ends of the chain bands 40—40' and retain the chain on the wheel I provide the end link 45, near its base and on the face opposite the hook 48, with an inwardly extending loop 50 and an inwardly opening socket 51 that coöperate with members on the opposite end link 46 as presently described. The link 46 is similar to the link 45, but is arranged oppositely thereto and comprises an extended arm 52 having a boss 53 on its inner face adapted to seat in the socket 51 of the link 45. The link 46 also has a latch 56 comprising a forwardly directed arm 57 that is slidably keyed in the link arm 52, and is curved forwardly at its rear end to form a latch tooth 58, which is adapted, when the links are brought together, to project into the loop 50 of the link 45 to lock the links together; the latch being normally urged forwardly by a spring 59 which seats within a socket 59' in the base of the link 46 and bears against the latch base.

With the two links so arranged, when the link 45 has been caught by the cross pins 49—49' on the wheel rings, and carried about the wheel, the faces of the links carrying the loops 50 are turned outwardly (Fig. VIII) and, as the wheel revolves, the link 46 is brought into position for its latch tooth to be pressed inwardly by engagement with the loop 50 and snap back into the loop, while the boss 53 seats in the socket 51 to lock the links together.

To remove the chains from about the wheels I provide each of the carriage belts with specially formed links 60—61 (Fig. XI); the link 60 containing an outwardly opening socket 62 having a pin 63 extending thereacross and the link 61 an outwardly opening snap socket 65 adapted for receiving a snap button 65' on the outer face of a chain link 46.

I also provide the forward ends of the latch arms 57 with forwardly inclined hooks 66 which are adapted to project into the sockets 62 beneath the cross pins 63.

With the links so arranged, when the driver wishes to remove the chain from about the wheel, he moves the carriage rearwardly by operation of the lever 27 and reverses the direction of the car. As the driver wheel travels in the reverse direction the link hooks 66 on the latch arms 57 are brought into engagement with the link 60, so that the hooks 66 project into the sockets 62 and seat beneath the cross pins 63.

Frictional engagement of the ring 21 and belts 17—17' causes the sprocket wheels 15—15' to revolve, carrying the belts 40—40' along therewith, and pressure of the cross pins 63 against the latch hooks 66 causes the latch arms 57 to move backwardly within the links 46 and the teeth 58 to unseat from the loops 50, allowing the chain links to separate.

The free ends of the chain bands 40—40' are then carried on about the carriage belts 17—17' until the links 45 leave the rings 21—21', when, on release of the lever 27, the carriage is returned to initial position by its springs.

After the links 46 are released from the links 45 the buttons 65' seat within the snap sockets 65 and are held on the carriage belts 17—17' as the latter travel about their sprocket wheels.

To further retain the tire chain in position on the carriage belts 17—17', I provide guide plates 68—68' which are mounted on the upper edges of the side plates 6—6' and have downwardly directed flanges 69—69' which closely overlie the chain bands 40—40' to retain the same and the chain 41 in position.

In order to prevent the cross chains carried by the side bands 40—40' from catching while passing each other through the housing, I provide a guide trough 70, which extends longitudinally through the housing and is supported at one end by the axle 18 and at its opposite end on a cross bar 71; the said trough being curved downwardly at its ends to facilitate the receiving of the chains when moving in either direction.

It will be seen that should the operator actuate the lever 27 to move the carriage rearwardly and bring the links 45 of the chains into engagement with the rings 21—21' when the cross pins 49—49' are not in a position to catch the hooks 48, the links would be displaced by the frictional contact and the parts would not coöperate successfully.

Therefore, to prevent any displacement of the chain until the link hooks 48 are caught by the pins 49—49', I provide the carriage with a stop latch (Fig. IX) comprising an arm 75 that is pivotaly mounted on the side plate 6 and has a forwardly and inwardly curved arm 76, the end of which lies in the path of a stud 77 projected from the side of a link in the belt 17. The opposite end of the arm 75 has an inturned foot 78 which is adapted to engage the end flange 79 at the open end of the housing 4, so that the outward movement of the carriage, until released by the latch, is limited to such an extent that the hooks 48 carried by the chain links 45 will project sufficiently to be engaged by the cross pin 49 in the groove of the wheel ring without engagement of the body of the link.

In order to produce the final movement of the carriage, as soon as the hooks 48 have been engaged by the rim pins 49, the stud 77 is placed on the belt 17 at such a position that at the same time the hooks are engaged by the pins, the stud 77 will engage the inturned end of the latch arm 76 to rock the outer end downwardly and move the opposite end upwardly and allow the latch foot to pass through a cut-out notch 80 in the flange and permit an additional outward movement of the carriage.

As soon as the belt carrying the stud 77 has moved sufficiently, the stud slips from the end of the arm 76 and the latch is drawn back to its normal horizontal position by means of springs 81—81' attached at opposite sides thereof and to the side plate, and the inturned foot 78 seats against the outer face of the flange 79 to retain the carriage in its outer limit until the chains have been carried completely about the drive wheels, when the latch arm 76 is engaged by a stud 85 projecting from the face of the link 61 to rock the latch in the opposite direction, so that the foot 78 will be moved upwardly and allowed to pass inwardly through a notch 86 that is spaced from the notch 80, thereby releasing the carriage and allowing it to be drawn into the housing by the springs 32—32'.

In order that the final outward movement may be given the carriage without an additional movement of lever 27, I provide the forward end of the lever bar 30 with an extended shank 90, which slidably projects through a slot 91 in a bearing 92 that is pivotally mounted at the lower end of the lever arm 28, and seated against the said bearing 92 and against a shoulder 93 at the base of the shank 90 is a coil spring 95; which bears against the lever arm; the said shank also carrying a pin 96 at its outer end, which prevents the shank from slipping from the bearing 92.

With this arrangement it will be seen that the operator may push forwardly on the lever arm to move the carriage rearwardly and to compress the spring 95, and as the latch 75 is released from the flange 79, the spring 95, being under compression, will move the carriage rearwardly to its limit.

To provide for stopping the carriage belts 17—17' at the exact positions to receive the interlocking links of the chain bands 40—40', I provide spaced stop members 98 (Fig. XV) which are slidably mounted in a guide way 98' that is secured on the inner face of the side plate 6' and are yieldingly held at their outer limit of travel in the guide by a compression spring 99 that seats within the guide way with its opposite ends bearing against inner faces of the slidable stops.

Each of the stops 98 is provided with an outwardly facing snap socket 99' which is adapted to yieldingly receive a pin 100 (Figs. II and IV) that projects laterally from the face of a link in the belt 17.

By so mounting the parts it will be seen that when either of the stops is engaged by the pin 100 the spring 99 will be compressed to gradually stop the motion of the carriage bands, thereby relieving the same from strain or jar and also permitting the coöperating locking links thereon to travel slightly past their normal position to entirely separate the interlocking parts, and after the locking parts have been released the locking links are moved back by the spring to their coöperative position.

The stop sockets 99' which receive the pin 100 serve to produce a tension on the belts 17—17' when the latter are engaged by the latch teeth 66 which is sufficient to overcome the pressure of the latch spring 59, so that the latch may be unseated from the link loop 50.

To prevent dust or mud from being thrown into the housings by the revolving drive wheels, I provide the open ends of the housings with doors 101 which are slidably mounted in vertical guides 102. Pivotally mounted at 104 on the opposite sides of the housings 4 are arms 103, the inner ends of which carry rollers 103' adapted to roll on guide plates 105 attached to the side plates 6—6' of the carriage, and the outer ends of which extend from the housing and have slotted end heads 106 for receiving pins 107 projecting outwardly from the opposite lower corners of the doors. With this arrangement, as a carriage is moved outwardly by operation of lever 27 the rollers 103' following the guide plates 105, are carried downwardly by the inclined surfaces 109 thereof and the outer ends of the arms are raised, thereby lifting the doors 101 within the guides 102 to open the housings and permit the carriages to be extended therefrom.

As the carriage is returned to its initial position the doors are again drawn closed by means of springs 110 which are attached to the arms 103 and to the walls of the housing 4.

Assuming that the parts are so constructed and assembled and the anti-skid chains mounted on the carriage but within the housing 4, should the operator of a car wish to place the chains on the wheels he grasps the lever arm 27, pushes it forwardly and thereby, through the lever bar 30, moves the carriage rearwardly within the housing, bringing it to such a position that the hooks 48 on the chain band links 45 project into the path of the cross pins 49—49' in the rings 21—21', so that the chain bands are caught thereby and carried about the wheel, bringing the end links 45—46 into coöperative position to effect their latched connection. The operator then releases the lever 27, and the carriage is automatically returned to initial position within the housing by the action of springs 32—32'.

To remove the chains from the wheels a similar operation is performed by the lever while the car is moving in a reverse direction, the operator pulling the lever 27 forwardly to move the carriage rearwardly from the housing. As the wheel 2 revolves in a reverse direction, the hook 66 at the end of the latch arm 57 is projected into the socket 62, in the link of the carriage belt beneath the cross pin 63, pressure on the hook causing the release of the latch tooth 58 from the link loop 50 and thereby releasing the ends of the chain and allowing the button 65' on the outer face of the link 46 to seat in the snap socket 65 in the link 61 to lock the ends of the chain bands 40—40' to the carriage belt bands 17—17'.

As the wheel continues to revolve the tire chain is wound on the carriage belt bands 17—17' and when the last links 45 leave the rings 21—21' the stud projecting from the belt band 17 engages the trip arm 76, moving the latter to unseat the inturned foot from the flange 79, so that it will pass through the notch opening 86 to release the carriage, which is then, under tension of the springs 32—32' drawn inwardly to its initial position, and the door 101 dropped downwardly to close the housing.

While I have shown a hand lever for actuating the carriage, it is apparent that a foot lever could be used and that changes could be made in the form of the chains and belts without departing from the spirit of the invention.

Having thus described my invention what I claim as new therein and desire to secure by Letters Patent, is:—

1. The combination with a vehicle body, of a longitudinally movable carriage comprising means on the carriage for supporting a tire chain, mechanism for manually shifting the carriage, a latch for limiting advance of the carriage, and yielding means for effecting advance of the carriage to functional position when freed by the latch.

2. The combination with a vehicle body, of a longitudinally movable carriage comprising means on the carriage for supporting a tire chain, mechanism for manually shifting the carriage, a latch for limiting advance of the carriage, and yielding means for effecting advance of the carriage to functional position when freed by the latch, a ground wheel, and means on the wheel for actuating said latch.

3. The combination with a vehicle body of a chain carriage, lever mechanism for manually advancing the carriage and including a cushion, a latch for restraining the carriage and tensioning the cushion, whereby supplemental advance is effected by the cushion upon release of the carriage by the latch.

4. The combination with a vehicle body, of a chain carriage, means for effecting stepped advance of said carriage, a latch for limiting advance of the carriage at a preliminary step, and a chain carrying belt on the carriage adapted for rocking said latch to permit secondary advance of the carriage.

5. The combination with a vehicle body, of a housing, having latch openings in one end, a chain carriage comprising a frame movable in said housing, a latch pivoted in the housing and having a member for normally engaging the housing to limit advance of the frame, a belt movable on the carriage and having a stud for engaging the latch to register the stop member with one of the latch openings in the end of the housing, for the purpose set forth.

6. In an apparatus of the character described, a movable belt comprising a lock actuating member, and means for connecting a chain with the belt.

7. In apparatus of the character described, a movable belt comprising a socket for receiving a lock projection, and means in said socket for actuating said lock.

8. In apparatus of the character described, a movable belt having a yielding socket therein for receiving an anchor head, for the purpose set forth.

9. In apparatus of the character described, a belt comprising a socket for receiving a lock projection, and containing means for actuating said projection to effect an unlocking function, and a spring socket adjacent the lock receiving socket for receiving and holding an anchoring head of an unlocked member.

10. In apparatus of the character described, a housing, a carriage movable in said housing, a belt movable on the carriage and comprising chain unlocking and anchoring portions, and means on the housing for limiting movement of the belt to position the said unlocking and anchoring portions relative to the carriage.

11. In apparatus of the character described, a housing, a carriage movable in said housing, a belt movable on the carriage and comprising chain unlocking and anchoring portions, a stud on the belt and catches on the carriage for receiving the belt stud to limit movement of the belt and position the unlocking and anchoring portions of the belt relative to the housing.

12. In apparatus of the character described, a housing, a carriage movable in said housing, a belt movable on the carriage and comprising chain unlocking and anchoring portions, a stud on the belt and oppositely facing, spaced catches on the carriage for receiving the belt stud to limit movement of the belt and position the unlocking and anchoring portions of the belt relative to the housing when the belt has delivered or received a chain, substantially as set forth.

13. In apparatus of the character described, a carriage comprising spaced side frames, paired sprocket wheels on each side frame, a belt run over each pair of sprocket wheels, and a trough carried by the side frames between the upper and lower belt paths.

14. In apparatus of the character described, a carriage comprising spaced side frames, paired sprockets rotatably mounted in each side frame, belts run over said sprockets and comprising links having grooved outer faces, for the purpose set forth.

15. In apparatus of the character described, a carriage comprising spaced side frames, paired sprockets rotatably mounted in each side frame, belts run over said sprockets and guard plate overhanging said belts.

16. In apparatus of the character described, a carriage comprising spaced side frames, paired sprockets rotatably mounted in each side frame, belts run over said sprockets and comprising links having grooved outer faces, and guard plates overhanging said belts and having downturned portions spaced from and coöperating with the trough to furnish chain retaining channels.

17. In apparatus of the character described, a housing, having an end opening, a door for closing said opening, mechanism on the housing for actuating said door, a carriage in the housing adapted for projection through the opening, and means on the carriage for operating the door actuating mechanism.

18. In apparatus of the character described, a housing, having an end opening, a door for closing said opening, lever mechanism on the housing for actuating the door in one direction, a carriage adapted for projection through said opening, a cam member on the carriage for actuating the lever mechanism, and a spring for returning the door after such actuation.

19. The combination with a carriage, of a tire chain removably mounted on the carriage, a ground wheel, and means on the chain and wheel coöperative to transfer the chain from the carriage to the wheel and retain the chain on the wheel, and a latch for connecting the ends of the chain when the same is positioned on the wheel.

20. The combination with a carriage, of a tire chain removably mounted on the carriage, a ground wheel, and means on the chain and wheel coöperative to transfer the chain from the carriage to the wheel and retain the chain on the wheel when the wheel is moved in one direction, means on the carriage for returning the chain to the carriage when the wheel is moved in the other direction, and means for moving the carriage to coöperative relation with the wheel.

21. In apparatus of the character described, a chain comprising end links, one having a boss socket and a latch keeper on its outer face, and hook and socket members on its inner face, the other having a boss for seating in the boss socket, a sliding latch for engaging said keeper and comprising an outwardly projecting lip, a spring for urging the latch to functional position and an outwardly facing boss member, a wheel, having hook and boss members for coöperation with like members on the first named chain link, a carriage having latch actuating and socket members adapted for coöperation with the latch and boss members on the chain, and means for urging the carriage toward the wheel, for the purpose set forth.

22. Mechanism for applying a non-skid chain to a wheel in motion, which comprises a chain support normally located in an out-of-the-way position, and means for shifting said support to operative position adjacent the wheel to automatically apply the chain, together with means automatically locking said support in operative position during the application of the chain to the wheel, and means automatically freeing said support after the chain has been applied to permit said support to return to its original position.

23. Mechanism for applying a non-skid chain to a wheel in motion, which comprises a chain support normally located in an out-of-the-way position, and means for shifting said support to operative position adjacent the wheel to automatically apply the chain, together with means automatically locking said support in operative position during the application of the chain to the wheel, and means automatically freeing said support after the chain has been applied to permit said support to return to its original position, and spring means for causing said return movement.

In testimony whereof I affix my signature.

EDWARD A. RYAN.